United States Patent
Soltani-Ahmadi et al.

[11] Patent Number: 5,900,384
[45] Date of Patent: * May 4, 1999

[54] DOUBLE METAL CYANIDE CATALYSTS

[75] Inventors: Ahmad Soltani-Ahmadi, Radnor; Bi Le-Khac, West Chester; Gerald A. Bullano, Glen Mills, all of Pa.

[73] Assignee: Arco Chemical Technology L.P., Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/683,269

[22] Filed: Jul. 18, 1996

[51] Int. Cl.$^6$ ............................................. B01J 27/26
[52] U.S. Cl. ................................ 502/175; 502/200
[58] Field of Search .................... 502/175, 200, 502/159

[56] References Cited

U.S. PATENT DOCUMENTS

| | | |
|---|---|---|
| 3,427,256 | 2/1969 | Milgron . |
| 3,427,334 | 2/1969 | Belner . |
| 3,427,335 | 2/1969 | Herold . |
| 3,829,505 | 8/1974 | Herold . |
| 3,941,849 | 3/1976 | Herold . |
| 4,282,387 | 8/1981 | Olstowski et al. . |
| 4,472,560 | 9/1984 | Kuyper et al. . |
| 4,477,589 | 10/1984 | van der Huist et al. . |
| 4,721,818 | 1/1988 | Harper et al. . |
| 4,987,271 | 1/1991 | Watabe et al. . |
| 5,010,047 | 4/1991 | Schuchardt . |
| 5,010,187 | 4/1991 | Heuvelsland . |
| 5,114,619 | 5/1992 | Heuvelsland . |
| 5,248,833 | 9/1993 | Hinney et al. . |
| 5,470,813 | 11/1995 | Le-Khac . |
| 5,482,908 | 1/1996 | Le-Khac . |

FOREIGN PATENT DOCUMENTS 4145123 of 0000 Japan .

*Primary Examiner*—Elizabeth D. Wood
*Attorney, Agent, or Firm*—Brooks & Kushman P.C.

[57] ABSTRACT

Double metal cyanide catalysts, prepared by drying a catalyst slurry by a non-agglomerative drying method such as spray drying or freeze drying, directly produces catalyst particles of fine particle size such that intensive grinding is not required. The catalysts thus produced are different from conventionally dried particles in that polyoxyalkylation may be conducted with less reactor fouling and a polyoxyalkylene product of lower unsaturation and narrower polydispersity may be obtained.

14 Claims, 1 Drawing Sheet

DOUBLE METAL CYANIDE CATALYSTS

TECHNICAL FIELD

The present invention pertains to double metal cyanide catalysts. More particularly, the subject invention pertains to a process for the manufacture of double metal cyanide complex catalysts which exhibit unexpectedly improved properties. The process involves catalyst preparation followed by a non-agglomerating drying step.

BACKGROUND ART

Double metal cyanide complex catalysts were discovered in the decade of the 1960s, and were found to have significant catalytic activity in a variety of reactions, particularly polymerizations. Although double metal cyanide salts themselves were found to have little or no catalytic activity, non-stoichiometric complexes formed from the double metal cyanide salt and an organic complexing agent were found to possess high activity. The activity was found to vary with the identity of the metals contained in the complex, and also with the organic complexing agents. The chemical makeup, effects of varying metal ions, and differences in reactivity due to the complexing agent are discussed in U.S. Pat. No. 3,427,335, herein incorporated by reference, which further indicates that polymers of different intrinsic viscosities, and therefore of differing molecular weight, may be obtained by suitable selection of organic complexing agent.

According to the '335 disclosure, excess complexing agents can be removed by extraction with a low boiling, non-complexing solvent such as pentane or hexane. In a typical laboratory catalyst preparation, a solution of an alkali metal hexacyanometallate salt, e.g. $K_3Fe(CN)_6$ is added slowly to a stirred solution of metal chloride salt, e.g. zinc chloride, in slight molar excess. The precipitated zinc hexacyanoferrate(III) salt is washed thoroughly with water, and then washed with three portions of anhydrous dioxane. In an optional procedure, the dioxane washed precipitate is slurried in dioxane/hexane and refluxed, water being removed as an azeotrope. The moist solid is dried under vacuum of c.a. 1 torr. The dry catalyst may be crushed to a fine powder.

The catalytic activity of catalysts of the type disclosed by the '335 patent and other related disclosures such as U.S. Pat. Nos. 3,427,256, 3,427,334, 3,829,505, and 3,941,849, although high, was not high enough to overcome the high cost of such catalysts relative to other catalysts traditionally utilized. For example, in conventional oxyalkylation reactions useful in preparing polyoxyalkylene polyols and polyoxyalkylene block surfactants, potassium hydroxide had long been the catalyst of choice due to its low cost. Moreover, removal of catalyst residues from double metal cyanide catalyzed polyols also proved to be problematic and to add additional expense to the production process. As a result, little if any commercialization of double metal cyanide catalysts of the types disclosed by the aforementioned patents occurred.

In the 1980's, double metal catalysts were revisited, spurred on in part by the desire to manufacture polyether polyols with lower unsaturation and higher equivalent weights. In base catalyzed polyoxyalkylation, a competing rearrangement of higher alkylene oxides into unsaturated alcohols continuously introduces monofunctional, oxyalkylatable species into the oxyalkylation reactor. For example, propylene oxide, the most widely used higher alkylene oxide, rearranges to allyl alcohol. Oxypropylation of this monohydric species results in polyoxyalkylene monols. Continued generation of allyl alcohol and the continued oxyalkylation of it and the previously generated and oxyalkylated monols results in a considerable proportion of monohydric species spanning a broad molecular weight range.

For example, in the manufacture of polypropylene glycols, the base catalyzed oxypropylation of a propylene glycol initiator results in a mixture of polyoxypropylene glycols and oxypropylated allyl alcohol polymers and oligomers. As oxypropylation continues, the mol percentage of monofunctional species steadily increases. In a 2000 Da equivalent weight polyoxypropylene "diol," the monofunctional species content may range between 30 and 40 mol percent, and the functionality reduced from the "nominal," or theoretical functionality of 2.0 to an actual, measured functionality in the range of 1.6 to 1.7. In the case of a 2000 Da equivalent weight triol, e.g. an oxypropylated glycerine polyol, the actual functionality will be closer to two than the nominal, or "theoretical" functionality of three.

Investigations of other catalysts in attempting to lower monol production during oxyalkylation did not, in general, lead to commercially acceptable systems. For example, lowering the reaction temperature during base catalyzed oxypropylation was found to lower unsaturation, but at the expense of greatly increased process time. Levels of unsaturation in the range of 0.010 meq/g polyol, as measured by ASTM 2849-69, "Testing of Urethane Foam Polyol Raw Materials" could be produced, but with reaction times measured in days or even weeks rather than typical batch times of 8 to 12 hours. Use of alternative catalysts such as cesium or rubidium hydroxide (U.S. Pat. No. 3,393,243); strontium or barium oxides and/or hydroxides (U.S. Pat. Nos. 5,010, 187 and 5,114,619); and alkaline earth metal carboxylates (U.S. Pat. No. 4,282,387) have all been proposed.

In U.S. Pat. Nos. 4,472,560 and 4,477,589, promoted double metal cyanide complex catalysts prepared by addition of inorganic acids or salts such as alkali metal hexafluorosilicates to double metal cyanide complexes were proposed. The promoter addition takes place in the presence of excess complexing agent, i.e. glyme, or in the presence of a liquid initiator, and following dehydration produces a catalyst/initiator slurry. However, a different slurry must be prepared for each different initiator desired, and the process cannot be used to prepare slurries of catalyst in volatile initiators. Moreover, the catalyst slurries are much more expensive to ship as compared to dry catalyst. However, the catalysts were stated to exhibit improved catalytic activity, and were also stated to be useful at temperatures in the range of c.a. 110° C. to 120° C., while prior DMC catalysts generally were rapidly deactivated at temperatures in excess of 100° C.

Further improvements in DMC catalysts are evidenced by the processes of preparation disclosed in U.S. Pat. No. 5,158,922, wherein modestly heated double metal cyanide-forming reactants, a relatively large stoichiometric excess of metal salt over metal cyanide salt, and a specific order of mixing these salts resulted in greatly improved catalytic activity. Japanese Patent Application Kokai No. 4-145123 disclosed that use of t-butanol as the organic complexing agent rather than glyme, the most common complexing agent, also resulted in improved catalysts, particularly with respect to catalyst longevity. These improvements, coupled with improved and less costly methods of removal of catalyst residues from finished polyether products as illustrated by U.S. Pat. Nos. 4,721,818; 4,987,271; 5,010,047; and 5,248,833, led to commercialization of DMC-catalyzed polyether polyols for a short time.

Most recently, discoveries by the ARCO Chemical Co. have resulted in double metal cyanide complex catalysts which not only offer polymerization rates which are considerably higher than prior catalysts, but moreover are far more easily removed from the polyoxyalkylene polyether product. While earlier DMC catalysts were able to produce polyols with levels of unsaturation in the range of 0.015–0.020 meq/g, these new catalysts consistently produce polyols with unsaturation in the range of 0.003 to 0.008 meq/g. Such catalysts are disclosed in U.S. Pat. Nos. 5,470,813 and 5,482,908, which are incorporated herein by reference. Double metal catalysts such as those disclosed by the 5,470,813 and 5,482,908 patents often allow for catalyst residue removal from polyol product by simple filtration. Moreover, the catalytic activity is so high in some cases that the low amounts of catalyst used, e.g. 10–25 ppm, does not require any removal process.

However, the process of preparing the double metal cyanide complex catalysts themselves is lengthy, and involves numerous steps. While the process is easily done on a laboratory scale, on a commercial scale, catalyst preparation time increases dramatically. For example, in a commercial scale manufacturing process, catalyst preparation may consume in excess of 100 hours. Approximately 88% of this time is consumed in isolating the catalyst solids, drying the moist filter cake obtained, and grinding the catalyst into small particles.

Surface morphology may also be of importance with respect to catalytic activity for double metal cyanide complex catalysts. For example, in U.S. Pat. No. 5,470,813, unique double metal cyanide catalysts were produced which differed from prior art catalysts by being substantially amorphous, rather than possessing significant amounts of highly ordered or crystalline material. The amorphous nature of these catalysts was demonstrated by the lack of certain sharp lines in the X-ray diffraction spectrum which are characteristic of crystalline double metal cyanide salts.

The substantially amorphous catalysts exhibited surprising and unexpected increases in catalytic activity, yet the particle size was actually much larger than that of prior art catalysts, prepared from similar chemical constituents, which thus presented higher surface area. The catalytic activity of such substantially amorphous catalysts can be increased yet further by grinding the catalyst to smaller particle sizes. Particle sizes less than 10 μm are desired.

The grinding process is very time intensive. Moreover, the moist, bulk filter cake produced during catalyst preparation retains a substantial amount of complexing agent, even after considerable time drying in vacuo. During this intensive grinding, surface modifications to the catalyst particles due to the inherent nature of the grinding operation may cause changes in catalytic activity. Thus, an increase in activity due to smaller particle size may be offset, at least in part, by a decrease in activity due to changes in surface morphology. Surface morphology may also affect properties other than activity per se. For example, double metal cyanide catalysts produced in finely ground form may also exhibit reactor fouling, in which gel-like and presumably very high molecular weight products accumulate in the reactor.

It would be desirable to provide a process by which double metal cyanide complex catalysts may be prepared with reduced processing time. It would be further desirable to be able to prepare double metal cyanide complex catalysts of small particle size without the risk of altering surface morphology by intensive grinding. It would be yet further desirable to prepare double metal cyanide complex catalysts which offer increased handling ease, increased storage stability, less reactor fouling during polymerization, and higher catalytic activity.

SUMMARY OF THE INVENTION

It has now been surprisingly discovered that double metal cyanide complex catalysts having improved catalytic activity, greater storage stability, and other desirable properties can be produced in very small particle sizes without intensive grinding, by slurrying the double metal cyanide complex catalyst into a volatile complexing agent and removing the excess complexing agent by a non-agglomerative removal method. As a result of the process, solid double metal cyanide complex catalysts of fine particle size are directly obtained. Preferred non-agglomerative methods of excess complexing agent removal include spray drying and freeze drying.

BRIEF DESCRIPTION OF THE DRAWING

The FIGURE illustrates, in schematic form, a spray dryer useful in accordance with a non-agglomerative drying method according to the present invention.

DESCRIPTION OF THE PREFERRED EMBODIMENTS

Figure 1:
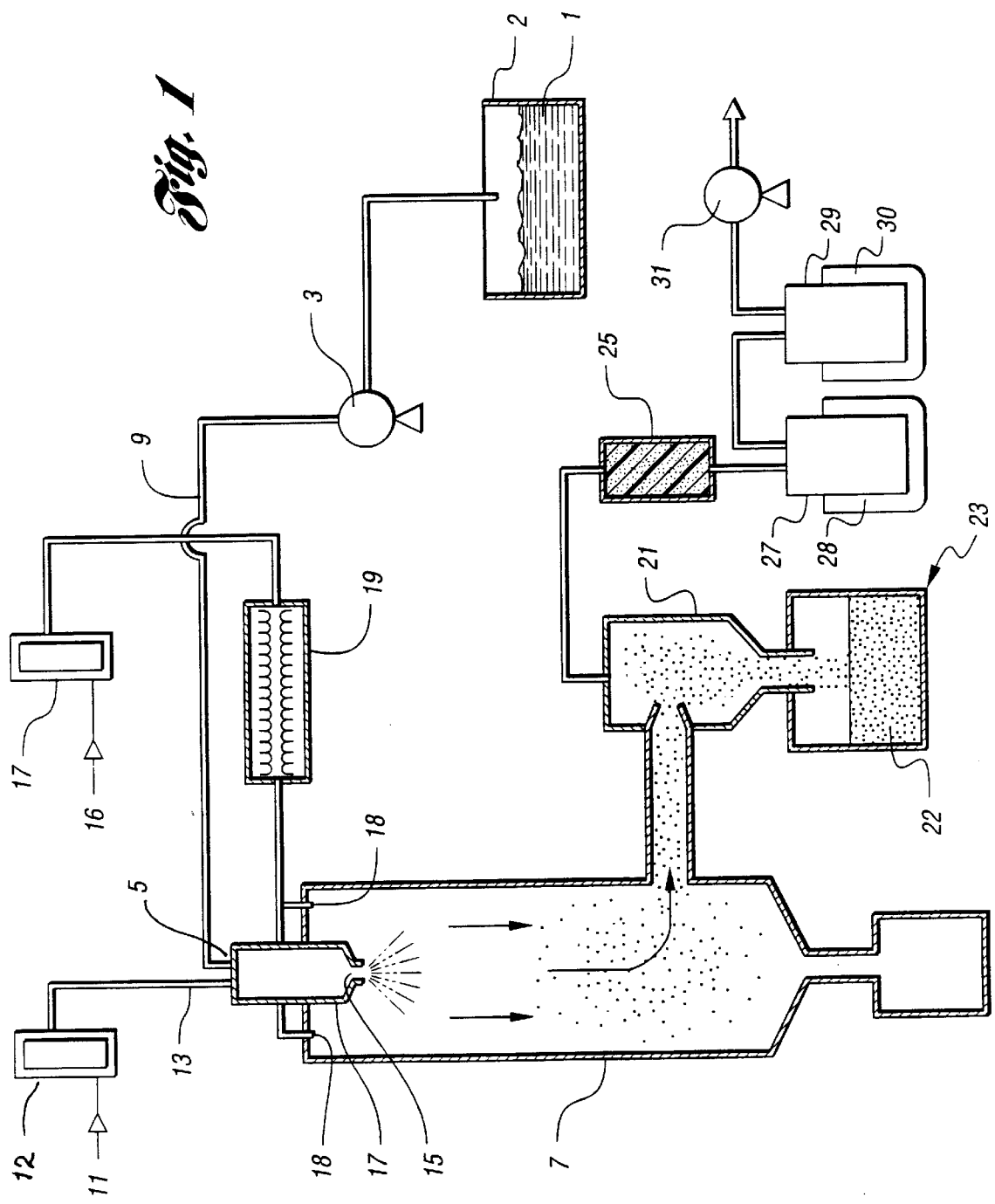

The double metal cyanide complex catalysts of the subject invention are non-stoichiometric complexes of a volatile organic complexing agent and a double metal cyanide salt, optionally containing activity promoters and optionally containing a further complexing agent as well. The double metal cyanide salts themselves are well known to the skilled artisan, and in general contain a negatively charged complex ion consisting of a first metal ion surrounded by a plurality of cyanide ions and complexing ligands, and a second metal cation which at least in part counterbalances the charge of the complex cyanide anion. Other anions, cations, activating agents, and the like, may also be present as well. The metals are, in general, transition metals or inner transition metals. Examples of double metal cyanide salts include zinc hexacyanocobaltates, nickel hexacyanoferrates, iron hexacyanoferrates, zinc hexacyanonickelates, and the like. Further examples of double metal salts may be found in the previously cited U.S. patents, which have been incorporated by reference, and in particular by U.S. Pat. No. 5,470,813, 5,482,908, and U.S. application Ser. No. 08/435,116, which is also incorporated herein by reference.

The volatile organic complexing agent is a heteroatom-containing organic ligand which can be removed from the double metal cyanide complex by evaporation. Examples of such organic ligands include low boiling alkanols, glycols, esters, ketones, nitriles, amides, ethers, and the like. Examples include isopropanol, 2-butanol, t-butanol, glyme, diglyme, diglyet, and the many complexing agents disclosed in the aforementioned patents. The volatile organic complexing agent is generally used in considerable excess, with that portion not involved in complex formation being subsequently removed. More than one volatile complexing agent may be used.

In addition to the volatile organic complexing agent, a substantially non-volatile complexing agent may be used as well. The non-volatile complexing agent is one which is oligomeric or polymeric in nature and generally has little vapor pressure at room temperature or below. The molecular weight of the non-volatile organic complexing agent is generally above 300 Da and often considerably higher, for example in the range of 1000 Da to 10,000 Da. Examples of preferred non-volatile complexing agents include polyoxyalkylene glycols and polyols, particularly polyoxypropylene glycols and polyoxypropylene polyols. Particularly suitable are polyoxypropylene polyols end-capped with isobutylene oxide to provide tertiary hydroxyl group termination.

A typical laboratory preparation of double metal cyanide complex catalyst is illustrated by Example 1 of U.S. Pat. No. 5,470,813, reproduced hereafter.

Laboratory Preparation of Double Metal Cyanide Catalyst

Potassium hexacyanocobaltate (8.0 g) is added to deionized water (1.50 ml) in a beaker, and the mixture is blended with a homogenizer until the solids dissolve. In a second beaker, zinc chloride (20 g) is dissolved in deionized water (30 ml). The aqueous zinc chloride solution is combined with the solution of the cobalt salt using a homogenizer to intimately mix the solutions. Immediately after combining the solutions, a mixture of tert-butyl alcohol (100 ml) and deionized water (100 ml) is added slowly to the suspension of zinc hexacyanocobaltate, and the mixture is homogenized for 10 minutes. The solids are isolated by centrifugation, and are then homogenized for 10 minutes with 250 ml of a 70/30 (v:v) mixture tert-butyl alcohol and deionized water. The solids are again isolated by centrifugation, and are finally homogenized for 10 minutes with 250 ml of tert-butyl alcohol. The catalyst is isolated by centrifugation, and is dried in a vacuum oven at 50° C. and 30 in. (Hg) to constant weight.

In the foregoing example, less than 10 g of catalyst is produced. Isolation of catalyst solids from the slurry of catalyst in t-butanol is performed in a laboratory centrifuge. The moist centrifuge cake is then dried under vacuum.

The standard laboratory techniques illustrated in the laboratory catalyst preparation are more difficult to implement on an industrial production scale. For example, the initially produced catalyst solids in the catalyst slurry are of a particle size which does not lend itself to isolation by filtration. For isolation by centrifugation, large and expensive centrifuges, e.g. a high rotation solid ejecting centrifuge, must be used. For drying the moist centrifuge cake or pellets obtained, numerous types of vacuum driers may be used. However, most are bulky and expensive batch driers, which seal with some difficulty, and which do not always offer either the desired rate of heat transfer or obtainable vacuum. For example, in the industrial preparation of approximately 135 Kg of catalyst, a 7,000–8,000 l batch reactor is required. The total process time will vary with the particular mode of catalyst preparation, for example with the number of wash and complexing steps, activating agent addition steps, etc. In a typical process, precipitation, washing, and isolation consumes approximately 84 hours, while drying and grinding consume an additional 24 hours, for a total cycle of approximately 108 hours. Thus, a considerable portion of the total time is directed to drying and grinding operations, while a further considerable portion involves isolation by centrifugation prior to drying. In the present process, the pre-drying centrifugation, moist centrifuge cake drying, and grinding operations are replaced by a non-agglomerative drying step. As a result, the process time is much shorter. A typical process utilizing spray drying as the means of catalyst isolation/drying consumes only about 76 hours.

The spray drying step has been found to produce catalyst with particle sizes less than 10 µm, thus rendering grinding unnecessary. The modified process saves 32 hours (4 shifts) of production time, and the cost of catalyst is greatly reduced as a result. However, it has been surprisingly found that the catalyst produced has higher catalytic activity, produces polyoxyalkylene polyols with less unsaturation, and importantly, with less reactor fouling than compositionally similar catalysts produced in the conventional manner. These results are completely surprising and unexpected. Due to the greater dryness, the storage stability is expected to be higher, as is also the ease of handling and packaging.

As used herein, the terms "drying" and "moist" are not used in the same sense as in other areas of technology as pertaining to water content. Water is substantially removed from the double metal cyanide salt by the first centrifugation and successive washes with complexing agent(s) which serve(s) to dehydrate the double metal cyanide salt as well as complex with the salt. Rather, the terms "dry," "drying," "moist" and "wet" refer in the present invention, to catalyst containing liquid other than water.

For example, in the conventional preparation of zinc hexacyanocobaltate-glyme complexes, the "moist" nature of the centrifuge cake is due to the presence of glyme beyond that which is involved in the formation of the complex. With t-butanol complexed catalysts, the presence of additional t-butanol produces the same effect. Following vacuum drying of moist centrifuge cake in the conventional process, a product which appears to be dry is obtained. This product can be easily crushed to powder. The majority of glyme or t-butanol still contained in the powdered catalyst is chemically bound in the double metal cyanide complex. However, a small proportion of complexing agent is still believed to be retained in non-bound form.

The initial catalyst complex preparation may be performed in numerous manners. For example, the salt solution, i.e. aqueous zinc chloride, may be added to the complex salt solution, i.e. aqueous potassium hexacyanocobaltate, organic complexing agent added, the solids isolated by filtration or centrifugation and reslurried in additional or different complexing agent. Alternatively, and preferably, the organic complexing agent is present at the time the two salts are first contacted, i.e. by adding the organic complexing agent to the potassium hexacyanocobaltate solution prior to adding the zinc chloride solution to it. Most preferably, the mixing is by high shear stirring, impingement mixing, homogenization, and the like.

Following initial preparation of the solid catalyst, the mother liquor is removed by filtration and/or centrifugation, and the catalyst is generally washed with water or water/complexing agent and/or reslurried in fresh complexing agent(s). This reslurrying may not always be necessary, but is generally desirable to produce catalysts of the greatest activity. The separation/reslurrying is generally performed twice, and may be performed numerous times. During the wash/reslurry process, substantially all water is removed from the catalyst. It may be appropriate at this time to add a second complexing agent, for example a polyoxypropylene polyol. Although such higher molecular weight complexing agents are generally only of limited solubility in water, many are of much higher solubility in lower molecular weight complexing agents such as glyme and t-butanol.

The present process avoids collection of the completed catalyst as a moist cake, whether by filtration, centrifugation, or other liquid/solid separation method. Rather, the completed catalyst is maintained in its last slurried or dispersed form, and subjected to a non-agglomerative drying process. In the sense used herein, "completed catalyst" refers to the catalyst at the point where all chemical modifications, i.e. washing, complexing, etc., have been completed, and catalyst isolation in dry form remains to be accomplished.

By "non-agglomerative drying" is meant a drying process in which particle agglomeration is substantially prevented. For example, examination of the catalyst particle size in a wet centrifuge cake indicates that the median particle size may be 1.5 μm. However, after drying such a cake in the conventional manner, i.e. vacuum drying, the resulting particle size is much larger. A 135 Kg batch, for example, requires about 12 hours of intensive grinding to obtain a median particle size less than 10 μm. Thus, during the drying stage, considerable particle agglomeration has occurred. By "non-agglomerative drying" is meant a drying process other than conventional vacuum drying of an isolated solid product such that significant agglomeration is prevented, and a powdered product of fine particle size may be directly obtained.

In many such non-agglomerative methods, particle to particle contact is minimized. In others, for example fluidized bed drying, Therma Jet™ flash drying, vacuum stripping with plough and ribbon, or other similar methods, particle-to-particle contact occurs, but the manner and/or duration of contact prevents agglomeration. Preferably, the powdered catalyst isolated from such a method has a particle size less than 40 μm, more preferably less than 20 μm, and most preferably about 10 μm or less, all without grinding. Most preferably, the particle sizes obtained from the non-agglomerative drying method will be of the same order of magnitude as those which would otherwise be contained in a wet filter cake obtained by centrifugation. Non-agglomerative processes which do not produce the smallest particles may require some grinding. However, the amount and intensity of grinding will be far less than that required when agglomerative drying operations are utilized, and any change in surface morphology accordingly minimized. Preferably, the non-agglomerative drying methods include spray drying and freeze drying.

In both spray drying and freeze drying, the double metal cyanide complex particles are isolated from other particles by a separating matrix. In the case of spray drying, the separating matrix is hot gas into which the catalyst/complex slurry is atomized. In a suitable spray drying apparatus, the dryer is constructed so as to allow the safe spray drying of organic substances. For example, the process may employ nitrogen or other substantially inert atmosphere, and may also be operated at reduced pressure. An oxygen analyzer at the dryer outlet can be used to ensure that oxygen concentration is below the limit of flammability. The feed to the dryer can be shut off manually or automatically if the oxygen concentration exceeds desired limits. In the case of freeze drying, the separating matrix is additional, non-chemically bound complexing agent and/or solvent. In both cases, as the complexing agent and/or solvent is removed, there is minimal contact of double metal cyanide complex particles, and particularly, little pressurized contact. Thus, very little agglomeration occurs.

BRIEF DESCRIPTION OF THE DRAWING

A pilot scale spray drying apparatus is illustrated by FIG. 1.

DETAILED DESCRIPTION OF THE DRAWING

The double metal cyanide complex catalyst slurry 1 is contained in slurry feed tank 2 and pumped from the slurry feed tank to the inlet 5 of spray dryer 7 by a feed pump 3, which may be of the peristaltic type or other type. As the catalyst slurry passes through supply line 9, it may optionally be heated or cooled. Nitrogen or other relatively inert gas is fed through line 11 through regulator 12 to atomizing gas inlet 13 of spray dryer 7. The atomizing gas pressure and volume, the catalyst slurry feed rate, and the size and geometry of atomizing nozzle 15 of atomizer 17 are adjusted to produce the desired degree of atomization. It is currently believed that a higher degree of atomization and a more dilute catalyst slurry both minimize agglomeration, and lead to finer particle sizes. The atomizer, nozzle, etc., may take numerous forms. For example, an atomizing nozzle which does not employ gas to assist in atomizing may be used. In lieu of an atomizer of the types previously described, a spinning disk atomizer, where a stream of catalyst slurry impinges upon a rapidly spinning disk may be used to implement atomization.

Heated drying gas is fed from source 16 through pressure regulator 17 through a heater 19 to supply heated gas to spray dryer 17 through drying gas inlets 18. From the spray dryer, the dried particulate catalyst passes to cyclone 21 where it is separated from the hot, vapor laden gas. Product 22 is collected in drums, cans, or other appropriate product collection containers 23. Organic complexing agent/solvent vapors pass through filter 25 to cold trap 27, which may be maintained at 0° C. in an ice bath, or cooled to an appropriate temperature by a refrigerating device 28. From the cold trap 27, the vapors pass to a further cold trap 29 maintained at lower temperature by device 30. Aspirator pump 31 ensures mass flow in the proper direction. The pump output may be adjusted to enable operation at less than atmospheric pressure, which is preferred.

Commercial spray dryers are readily available, and are commonly used for spray drying instant coffee, instant tea, dyes and pigments, synthetic elastomer particles, etc. The theory and operation are well known, and need not be described here. On a commercial scale, the ice bath and dry ice cold traps would likely be replaced by refrigerated units. Parameters such as gas flow, temperature, degree of atomization, slurry input rate and concentration, etc. can all be adjusted. The process has not been optimized, but as can be seen from the actual example, the non-optimized process already produces a surprisingly superior catalyst.

Freeze drying is a further non-agglomerative means of drying catalyst in accordance with the subject invention. In the freeze drying process, solids, as a dispersion or dissolved in a liquid continuous phase or solvent, in this case complexing agent and/or solvent, are frozen, following which the normally liquid continuous phase or solvent is removed by sublimation at reduced pressure. Freeze drying has an advantage in that it avoids the higher temperatures associated with spray drying and other drying methods. For this reason, freeze drying is commonly used for temperature labile products such as biochemicals, pharmaceuticals, and the like. Freeze drying has been used for many years for the freeze drying of instant coffee.

Freeze drying may be accomplished in a batch or continuous process. In continuous processes, the composition to be freeze dried must traverse a freeze drying chamber having means to seal the entry and exit so as to maintain suitable vacuum. In batch-type processes, the composition may be placed in metal trays in a vacuum chamber, frozen, and sublimed. In either case, the time in which freeze drying is accomplished is minimized by maximizing surface area of the frozen composition. The freeze drying process and equipment for its use are well known to those skilled in the art of freeze drying equipment.

Having generally described this invention, a further understanding can be obtained by reference to certain specific examples which are provided herein for purposes of illustration only and are not intended to be limiting unless otherwise specified.

EXAMPLE 1

Catalyst Preparation

A solution of 7.5 g potassium hexacyanocobaltate dissolved in 300 ml distilled water and 50 ml t-butanol was introduced into a 500 ml beaker. In a separate beaker, 75 g zinc chloride was dissolved in 75 ml distilled water. The solution of zinc chloride thus prepared was added to the potassium hexacyanocobaltate solution over a period of 30 minutes at 30° C. with intensive mixing using a PowerGen™ homogenizer set at a 20% power level. Following completion of addition, the mixing intensity was increased to 40% and mixing continued for 10 minutes. The solids were then isolated by centrifuging at 17,000 rpm for 30 minutes. The centrifuge cake was reslurried in 155 ml t-butanol and 55 ml distilled water in a 500 ml beaker and homogenized at 40% power level for 10 minutes. The solids were isolated by a centrifugation as previously done, and then reslurried in 185 ml t-butanol at a 40% power level for 10 minutes. The centrifuge cake was divided into two halves. The first half (Catalyst A), was dried at 60° C. under 30 in/Hg vacuum until a constant weight was obtained. The catalyst was then crushed into fine powder. The second half of the isolated moist cake was reslurried into 1,000 ml t-butanol at 25% homogenizing power for 10 minutes. This slurry was frozen in an ice bath and then freeze dried under vacuum. A fluffy powder catalyst was obtained directly. This freeze dried catalyst is denoted as Catalyst B.

EXAMPLE 2 AND COMPARATIVE EXAMPLE C2

Polyol Synthesis

The catalysts prepared in Example 1 were used to prepare 8,000 Da polyoxypropylene diols. A one liter stirred reactor was charged with catalyst (0.0166 g, 25 ppm relative to finished polyol) and a 785 Da molecular weight polyoxypropylene diol (65 g) prepared conventionally from propylene glycol, KOH, and propylene oxide was used as the initiator molecule. The mixture was well stirred and heated to 105° C. under vacuum for about 30 minutes to remove traces of residual water. The reaction temperature was increased to 130° C., and approximately 11 g of propylene oxide added to increase the pressure in the reactor from vacuum to about 2 psig.

An accelerated pressure drop was noted, indicating the catalyst had become active. After catalyst initiation was verified, additional propylene oxide (600 g total) was continuously added at a rate of approximately 1.7 g/min over 6 hours. The reactor was held at 130° C. for 30–45 minutes until a constant pressure was obtained, which indicated that propylene oxide conversion was complete. The mixture was stripped under vacuum at 60° C. for 30 minutes to remove traces of unreacted propylene oxide. The product was cooled and recovered and its properties measured. The properties of the polyols prepared from Sample A and Sample B catalysts of Example 1 are presented in Table 1 below.

TABLE 1

| Catalyst: | Catalyst A (Conventionally Dried) | Catalyst B (Freeze Dried) |
| --- | --- | --- |
| Polyol Properties | | |
| Hydroxl No. | 14.6 | 15.0 |
| Unsaturation (meq/g) | 0.0067 | 0.0061 |
| Polydispersity, $M_w/M_n$ | 1.23 | 1.19 |
| Viscosity, cps, 25° C. | 4150 | 3940 |
| Gel Formation? | Yes | No |

As can be seen, the freeze dried catalyst of the subject invention are capable of producing polyols with lower unsaturation, lower polydispersity, and lower viscosity, while not producing reactor fouling. These results are totally unexpected and surprising.

EXAMPLE 3

Spray Dried Catalyst Preparation

A double metal cyanide catalyst is prepared substantially in accordance with Example 1, however, following reslurrying of the centrifuge cake in t-butanol, the slurry is divided into two parts. The first part is centrifuged and dried in the conventional manner, and is identified as Catalyst C. The second portion is introduced into a pilot plant scale spray drier as illustrated in FIG. 1, employing a feed rate of 10 ml/min of catalyst slurry. Approximately 7.5 liters/minute of nitrogen heated to a temperature of 106° C. is used to dry the atomized catalyst slurry. The catalyst is collected from a cyclone, and its particle size and activity measured. Also measured are the catalyst particle sizes in the undried, wet centrifuge cake obtained from the first portion of the slurry (Catalyst C). Particle sizes were measured by conventional light scattering techniques in a Microtrac Full Range Particle Size Analyzer by volume distribution. The particles in the wet cake and the spray dried particles were found to have the particle sizes indicated in Table 2 below. The particle sizes reported herein are in $\mu$m (microns).

TABLE 2

| Sample | Particle Size ($\mu$m) Distribution | | |
| --- | --- | --- | --- |
| Description | 10% | 50% | 90% |
| Spray Dried | 1.03 | 2.93 | 9.56 |
| Final wet cake | 0.65 | 1.50 | 3.10 |
| Conventionally Dried and Ground Wet Cake | 15.22 | 127.04 | 326.32 |

As can be seen from the table, very little agglomeration occurred during the spray drying process over what was the particle size contained in the final wet cake. In contrast, during conventional vacuum drying of the wet cake, considerable particle agglomeration takes place resulting in the necessity of prolonged grinding to obtain a reasonable particle size. The spray dried particles have a median size of 2.93 microns as obtained from the spray drier.

EXAMPLE 4 AND COMPARATIVE EXAMPLE 4

Two 6000 Da polyoxypropylene triols were produced by oxyalkylating an oligomeric oxypropylated glycerine starter using the spray dried catalyst of Example 3 and the comparative catalyst prepared by conventional vacuum drying. The rates of oxypropylation, the unsaturation of the polyoxypropylated triol product, and degree of reactor fouling were noted. The results are presented in Table 3 below.

TABLE 3

| Example<br>Catalyst | 4C<br>Catalyst C<br>(conventional) | 4<br>Catalyst D<br>(spray dried) |
|---|---|---|
| Reaction rate (g PO/min) | 20.0 | 21.7 |
| Unsaturation meq/g | 0.0034 | 0.0032 |
| Reactor Fouling | mild | none |

As can be seen, the spray dried catalyst offered a slightly higher reaction rate, lower unsaturation, and eliminated reactor fouling.

EXAMPLES 5 AND C5

The procedure of Example 2 is followed to prepare 8000 Da polyoxypropylene diols using the spray dried, and conventionally dried catalysts of Example 3. The viscosity and unsaturation are indicated in Table 4 below.

TABLE 4

| Example<br>Catalyst | 5C<br>Catalyst C | 5<br>Catalyst D |
|---|---|---|
| Diol Viscosity (cps) | 3750 | 3780 |
| Unsaturation | 0.0071 | 0.0051 |

The viscosities of the polyol products are virtually identical, however the unsaturation of the polyol produced using the spray dried catalyst is considerably lower at 0.0051 meq/g as compared to 0.0071 meq/g for the conventionally dried catalyst.

Having now fully described the invention, it will be apparent to one of ordinary skill in the art that many changes and modifications can be made thereto without departing from the spirit or scope of the invention as set forth herein.

What is claimed is:

1. A process for the preparation of a double metal cyanide complex catalyst, comprising:
   a) preparing a slurry of double metal cyanide complex catalyst particles in a continuous phase comprising a volatile organic complexing agent;
   b) drying said double metal cyanide complex catalyst particles by removing said volatile organic complexing agent by a non-agglomerative drying method; and
   c) recovering a powdered double metal cyanide complex catalyst having a median particle size of less than 40 $\mu$m.

2. The process of claim 1 wherein said non-agglomerative drying method comprises spray drying.

3. The process of claim 1 wherein said non-agglomerative drying method comprises freeze drying.

4. The process of claim 1 wherein said slurry further comprises a volatile organic solvent different from said volatile organic complexing agent.

5. The process of claim 1 wherein said median particle size is less than about 20 $\mu$m.

6. The process of claim 1 wherein said median particle size is less than about 10 $\mu$m.

7. The process of claim 1 wherein said median particle size ranges from greater than 10 m to less than 40 and further comprising grinding the powdered double metal cyanide complex catalyst particles to a smaller median particle size.

8. Double metal cyanide complex catalyst particles comprising the product produced by the process of:
   a) preparing a slurry of double metal cyanide complex catalyst particles in a continuous phase comprising a volatile organic complexing agent;
   b) drying said double metal cyanide complex catalyst particles by removing said volatile organic complexing agent by a non-agglomerative drying method; and
   c) recovering a double metal cyanide complex catalyst having a median particle size of less about than 40 $\mu$m.

9. The double metal cyanide complex catalyst of claim 8, wherein said particles have a median particle size of less than about 20 $\mu$m.

10. The double metal cyanide complex catalyst of claim 8, wherein said particles have a median particle size of less than about 10 $\mu$m.

11. The catalyst of claim 8 wherein said double metal cyanide complex catalyst comprises a zinc hexacyanocobaltate complex containing t-butanol as a complexing organic agent.

12. The catalyst of claim 11 wherein said zinc hexacyanocobaltate complex further contains a polyoxyalkylene polyol having a molecular weight of from about 200 Da to about 10,000 Da.

13. The catalyst of claim 8 wherein said non-agglomerative drying method comprises spray drying.

14. The catalyst of claim 8 wherein said non-agglomerative drying method comprises freeze drying.

* * * * *

UNITED STATES PATENT AND TRADEMARK OFFICE
CERTIFICATE OF CORRECTION

PATENT NO. : 5,900,384
DATED : May 4, 1999
INVENTOR(S) : Ahmad Soltani-Ahmadi et al.

It is certified that error appears in the above-identified patent and that said Letters Patent is hereby corrected as shown below:

Column 12, claim 7,
Line 14, delete "ranges from" and insert "is"; after "10 and before "m" insert -- µ --; delete "to less than 40 and".
Line 16, delete "complex catalyst".
Line 16, after "a" delete "smaller median" and insert "ground particle size less than said median".

Signed and Sealed this

Twenty-third Day of October, 2001

Attest:

NICHOLAS P. GODICI
Attesting Officer    Acting Director of the United States Patent and Trademark Office